United States Patent [19]

Lee

[11] Patent Number: 5,686,973
[45] Date of Patent: Nov. 11, 1997

[54] METHOD FOR DETECTING MOTION VECTORS FOR USE IN A SEGMENTATION-BASED CODING SYSTEM

[75] Inventor: Min-Sup Lee, Seoul, Rep. of Korea

[73] Assignee: Daewoo Electronics, Co., Ltd., Seoul, Rep. of Korea

[21] Appl. No.: 580,238

[22] Filed: Dec. 28, 1995

[30] Foreign Application Priority Data

Dec. 29, 1994 [KR] Rep. of Korea ............... 94-38636

[51] Int. Cl.$^6$ .................................................. H04N 7/32
[52] U.S. Cl. ................... 348/699; 382/236; 382/238
[58] Field of Search ............................. 348/384, 390, 348/400–402, 407, 409–416, 420, 699, 26; 382/232, 236, 238, 266; 345/121, 122; H04N 7/130, 7/137

[56] References Cited

U.S. PATENT DOCUMENTS

| | | | |
|---|---|---|---|
| 5,502,492 | 3/1996 | Jung | 348/416 |
| 5,546,129 | 8/1996 | Lee | 348/699 |
| 5,579,050 | 11/1996 | Jung | 348/413 |
| 5,581,308 | 12/1996 | Lee | 348/413 |
| 5,598,216 | 1/1997 | Lee | 348/416 |

*Primary Examiner*—Richard Lee
*Attorney, Agent, or Firm*—Pennie and Edmonds, LLP

[57] ABSTRACT

A method, for use in a segmentation-based coding system, for detecting motion vectors between a current frame and a previous frame of digital video signal comprises the steps of (a) generating segmentation data for each of the segmented regions, the segmentation data including contour information representing the shape and location for each segmented region and texture information representing a mean gray level of all pixels contained in each segmented region, (b) generating candidate segmentation data for each of the candidate regions, (c) producing a minimum-sized predetermined geometric pattern for encompassing a segmented region, (d) producing a minimum-sized predetermined geometric pattern for encompassing each of the candidate regions, (e) calculating an error value between the segmented region and each of the candidate regions, (f) selecting a candidate region yielding a smallest error value as a search region, (g) detecting one or more motion vectors between the segmented region and the search region; and (h) repeating said steps (c) to (g) for all the segmented regions.

1 Claim, 2 Drawing Sheets

1

METHOD FOR DETECTING MOTION VECTORS FOR USE IN A SEGMENTATION-BASED CODING SYSTEM

FIELD OF THE INVENTION

The present invention relates to a motion vector detecting method and, more particularly, to an improved motion vector detection method for effectively detecting motion vectors for use in a segmentation-based coding system.

DESCRIPTION OF THE PRIOR ART

In a digital video system such as video-telephone, teleconference or high definition television, a large amount of digital data is needed to define each video frame signal since a video line signal in the video frame signal comprises a sequence of digital data referred to as pixel values. However, since the available frequency bandwidth of a conventional transmission channel is limited, in order to transmit the substantial amount of digital data therethrough, it is inevitable to compress or reduce the volume of data using the use of various data compression method, especially, in a case of such low bit-rate video codec(coding-decoding) systems as video-telephone and teleconference apparatus.

One of such methods for encoding video signals for a low bit-rate encoding system is the so-called segmentation-based coding method.

In a first step of the segmentation-based coding method, images are simplified in order to make it easier to segment them. In a next step called a feature extraction step, there are produced markers corresponding to the interior of homogeneous areas, i.e., segmented regions, of the simplified image. Once the markers have been obtained, the precise contours of the segmented regions detected at the feature extraction step can be found using an efficient morphological tool called a watershed algorithm.

The contour and texture information of each segmented region is then coded. There are two types of information constituting the contour information: shape and location. The shape information refers to the form of each contour, whereas the location information deals with the position of each contour within the image. And as the texture information, a mean gray level of the pixels included in each segmented region is coded.

Meanwhile, interframe coding method is one of the effective coding methods to compress data in video sequences. Motion-compensated interframe coding method, especially, has been proposed to improve the efficiency of image coding for the transmission of compressed data. This method is used to predict current frame data from previous frame data based on an estimation of a motion between a current and a previous frames. Such an estimated motion may be described in terms of two dimensional motion vectors representing displacements between corresponding pixels of the previous and the current frames.

One of the motion vector estimation methods which have been proposed in the conventional segmentation-based coding technique is a feature point-based motion estimation method.

In the feature point-based motion estimation method, motion vectors for a set of selected pixels, i.e., feature points, are transmitted to a receiver, wherein the feature points are defined as pixels of a current frame capable of representing a motion of an object so that the entire motion vectors for the pixels in the current frame can be recovered or approximated from those of the feature points at the receiver. Generally, the feature points are selected from points on the contour of a segmented region by using a known grid technique, which employs one of various types of grid, e.g., rectangular grids. That is, intersection points of the grids and the contour of each region are selected as feature points. And the motion vectors of the selected feature points in the current frame are determined through the use of a conventional block matching technique, wherein each of the motion vectors represents a spatial displacement between one feature point in the current frame and a corresponding matching point, i.e., a most similar pixel, in the previous frame. Specifically, the matching point for each of the feature points is searched on the contours of all segmented regions within a search area in the previous frame.

Since, however, in most cases, a segmented region of the current frame corresponds to one of the segmented regions within the search area, in order to reduce calculation burden related to the motion estimation, rather than to carry out a motion estimation with respect to all of the segmented regions in the search area, it is preferable to select one segmented region in the search area as a candidate region for the segmented region of the current frame and then carry out the motion estimation therebetween.

SUMMARY OF THE INVENTION

It is, therefore, a primary object of the invention to provide an improved motion vector detection method for effectively detecting motion vectors for use in a segmentation-based coding system.

In accordance with the present invention, there is provided a method, for use in a segmentation-based coding system, for detecting motion vectors between a current frame and a previous frame of a digital video signal, wherein the current frame includes a plurality of segmented regions and the previous frame includes a multiplicity of candidate regions, which comprises the steps of:

(a) generating segmentation data for each of the segmented regions, the segmentation data including contour information representing the shape and location for each segmented region and texture information representing a mean gray level of all pixels contained in each segmented region;

(b) generating candidate segmentation data for each of the candidate regions, the candidate segmentation data including contour information representing the shape and location for each candidate region and texture information representing a mean gray level of all pixels contained in each candidate region;

(c) producing a minimum-sized predetermined geometric pattern for encompassing a segmented region to thereby generate size information thereof;

(d) producing a minimum-sized predetermined geometric pattern for encompassing each of the candidate regions to thereby generate size information thereof;

(e) calculating an error value between the segmented region and each of the candidate regions based on the segmentation data and the size information for the segmented region and each of the candidate regions, thereby providing a set of error values for the segmented region;

(f) selecting a candidate region yielding a smallest error value in the set of error values as a search region having a closest similarity with the segmented region;

(g) detecting one or more motion vectors between the segmented region and the search region; and (h) repeating said steps (c) to (g) for all the segmented regions.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
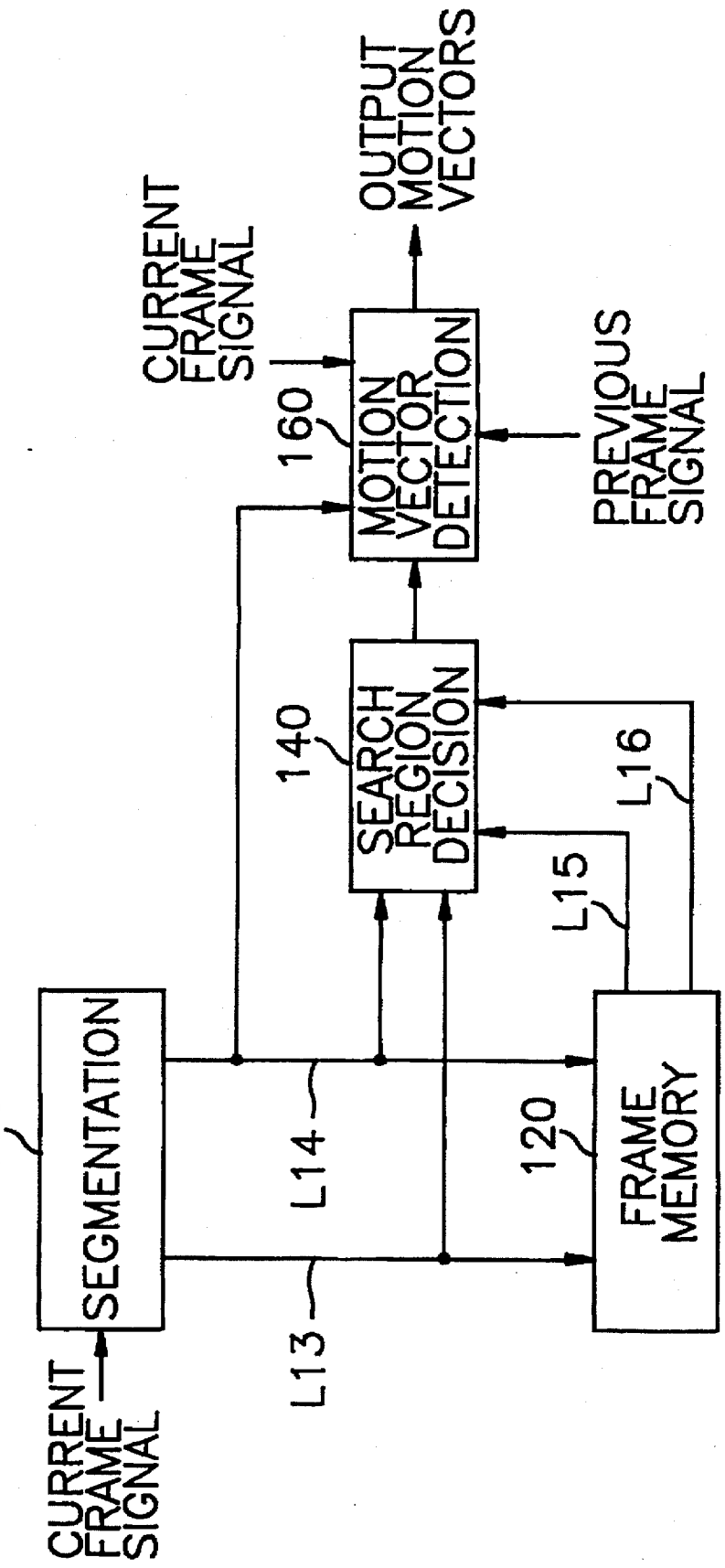
FIG. 1 represents a block diagram of the motion vector detector in accordance with the present invention.

Referring to FIG. 1, there is shown a block diagram of a motion vector detector in accordance with the present invention. The motion vector detector includes a segmentation block 100, a frame memory 120, a search region decision block 140 and a motion vector detection block 160.

A current frame signal is provided to the segmentation block 100 and the motion vector detection block 160.

The segmentation block 100 segments the current frame into a plurality of regions to generate segmentation data, i.e., contour and texture information, for each of the segmented regions, wherein the contour information for each segmented region represents the shape and location of said each segmented region and the texture information thereof represents a mean gray level value M of all the pixels contained in said each segmented region. The segmentation block 100 sequentially provides, in response to a first control signal fed from a controller(not shown), the segmentation data on a region-by-region basis: that is, the texture information of each segmented region is provided to the frame memory 120 and the search region decision block 140 through a line L13; and its contour information is provided to the frame memory 120, the search region decision block 140 and the motion vector detection block 160 via a line L14.

At the frame memory 120, the segmentation data from the segmentation block 100 is stored as the segmentation data of candidate regions of a previous frame. And, in response to a second control signal fed from the controller(not shown), the frame memory 120 provides the segmentation data of the candidate regions to the search region decision block 140, wherein the texture and contour information of each candidate region are provided through lines L15 and L16, respectively.

The search region decision block 140 calculates an error value between a current segmented region and each of the candidate regions based on the segmentation data of the current segmented region on the lines L13 and L14 and the segmentation data of the candidate regions on the lines L15 and L16 and decides a candidate region yielding a minimum error value as a search region for estimating motion vectors of the pixels in the current segmented region. Details of the search region decision block 140 will be described with reference to FIG. 2.

Figure 2:
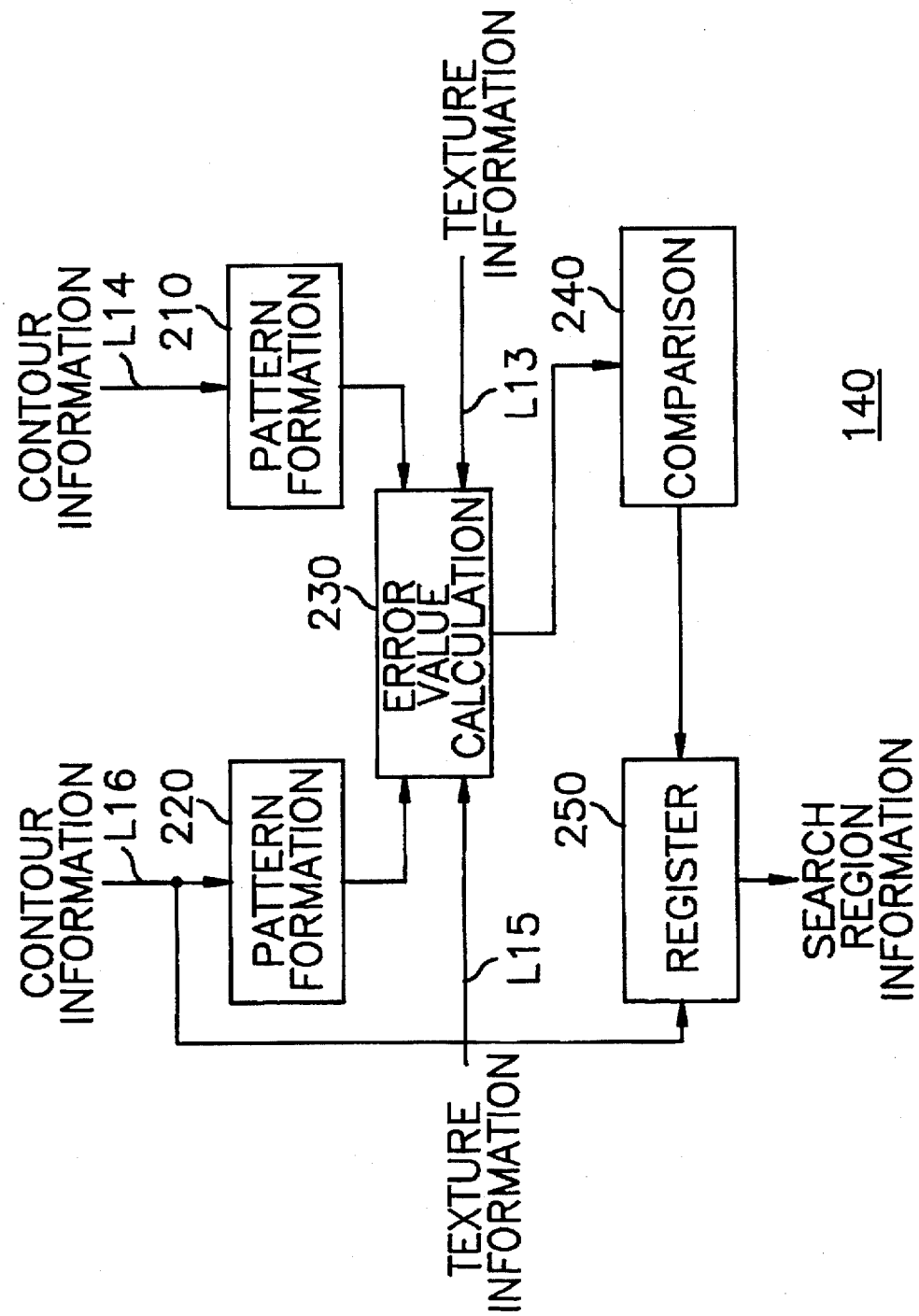
FIG. 2 shows a detailed block diagram of the search block decision block of FIG. 1.

Referring to FIG. 2, there is illustrated in details the search region decision block 140 shown in FIG. 1. The search region decision block 140 comprises pattern formation sections 210 and 220, an error value calculation block 230, a comparison block 240 and a register 250.

The pattern formation section 210 receives the contour information of the current segmented region via the line L14 and produces a predetermined geometric pattern, e.g., a rectangle, of a minimum size for enveloping the current segmented region to thereby provide pattern information therefor; and also generates size information $S_s$ for the current segmented region, wherein the pattern information is represented by a width $W_s$ and a height $H_s$ of the rectangle and the size information is represented by the number of pixels in the current segmented region. The pattern information and the size information is fed to the error value calculation block 230.

Also, the pattern formation section 220 receives the contour information of the candidate regions via the line L16 and produces a predetermined geometric pattern, e.g., a rectangle, for each of the candidate regions in a similar manner as in the pattern formation section 210; and provides the error value calculation block 230 with pattern and size information for each of the candidate regions, wherein the pattern information is represented by a width $W_c$ and a height $H_c$ of a rectangle for each candidate region and the size information is represented by the number of pixels included in each candidate region.

At the error value calculation block 230, based on the texture information on the lines L13 and L15 and the size, width and height data $S_s$, $S_c$, $W_s$, $W_c$, $H_s$, $H_c$ from the pattern formation sections 210 and 220, an error value E between the current segmented region and each of the candidate regions is calculated as follows:

$$E = \omega_1 D_s + \omega_2 D_t + \omega_3 D_g$$

wherein $D_s = |S_s - S_c|$, $D_t = |M_s - M_c|$, $D_g = |(W_s - W_c)^2 + (H_s - H_c)^2|$, and $\omega_1$, $\omega_2$ and $\omega_3$ are weight factors, $M_s$ and $M_c$ being the texture information for the current segmented region and each of the candidate regions, respectively.

The error values calculated as above are provided to the comparison block 240, sequentially.

The comparison block 240 serves to compare a stored value with an error value inputted thereto. And the comparison block 240 updates the stored value with the input error value and generates an input enable signal if the input error value is smaller than the stored value. When a first error value is received, the comparison block 240 compares the first error value with a prestored error value in a memory(not shown). The prestored error value is stored to be of a large number compared with any possible error values, and, therefore, the comparison block 240 updates the prestored error value with the first error value, and generates the input enable signal. Subsequently, at the comparison block 240, an error value newly provided from the error value calculation block 230 is compared with the updated error value; and, if the new error value is smaller than the updated error value, the comparison block 240 updates the memory with the new error value and generates the input enable signal.

In the meantime, the contour information of the candidate regions is provided to the register 250, sequentially. In response to each of the input enable signals fed from the comparison block 240, the register 250 is updated with contour information newly received.

When the above process for the current segmented region with respect to all the candidate regions is completed, the controller(not shown) provides an output enable signal to the register 250. The register 250 provides, in response to the output enable signal, the stored contour information as the search region information for the current segmented region.

Referring back to FIG. 1, the current frame signal and a previous frame signal from a memory(not shown), the contour information of the current segmented region on the line L14 and the search region information from the search region decision block 140 are fed to the motion vector detection block 160. At the motion vector detection block 160, the motion vectors for the current segmented region are detected between the current segmented region and the search region by using, e.g., a conventional feature point-based motion estimation technique. The detected motion vectors for the feature points are outputted as motion vectors of the current segmented region.

While the present invention has been described with respect to the particular embodiments, it will be apparent to those skilled in the art that various changes and modifications may be made without departing from the scope of the invention as defined in the following claim.

What is claimed is:

1. A method, for use in a segmentation-based coding system, for detecting motion vectors between a current frame and a previous frame of a digital video signal, wherein the current frame includes a plurality of segmented regions and the previous frame includes a multiplicity of candidate regions, which comprises the steps of:

(a) generating segmentation data for each of the segmented regions, the segmentation data including contour information representing the shape and location for each segmented region and texture information representing a mean gray level of all pixels contained in each segmented region;

(b) generating candidate segmentation data for each of the candidate regions, the candidate segmentation data including contour information representing the shape and location for each candidate region and texture information representing a mean gray level of all pixels contained in each candidate region;

(c) producing a minimum-sized predetermined geometric pattern for enveloping a segmented region to thereby generate size information thereof;

(d) producing a minimum-sized predetermined geometric pattern for enveloping each of the candidate regions to thereby generate size information thereof;

(e) calculating an error value between the segmented region and each of the candidate regions based on the segmentation data and the size information for the segmented region and each of the candidate regions, thereby providing a set of error values for the segmented region;

(f) selecting a candidate region yielding a smallest error value in the set of error values as a search region having a closest similarity to the segmented region;

(g) detecting one or more motion vectors between the segmented region and the search region; and (h) repeating said steps (c) to (g) for all the segmented regions.

* * * * *